United States Patent
Robinson, Jr.

(10) Patent No.: US 8,418,684 B2
(45) Date of Patent: Apr. 16, 2013

(54) CATALYTIC CONVERTER UNIT AND METHOD FOR TREATING COOKING EMISSIONS

(75) Inventor: John W. Robinson, Jr., Bloomer, WI (US)

(73) Assignee: Catalytic Combustion Corporation, Bloomer, WI (US)

( * ) Notice: Subject to any disclaimer, the term of this patent is extended or adjusted under 35 U.S.C. 154(b) by 1124 days.

(21) Appl. No.: 11/895,495

(22) Filed: Aug. 24, 2007

(65) Prior Publication Data

US 2009/0050129 A1    Feb. 26, 2009

(51) Int. Cl.
  *F24C 15/20*    (2006.01)
(52) U.S. Cl.
  USPC .............. 126/19 R; 126/21 R; 126/299 R; 422/173; 99/476; 219/398; 219/413; 219/414
(58) Field of Classification Search .............. 126/19 R, 126/21 R, 299 R; 422/173; 99/476; 219/398, 219/413, 414
  See application file for complete search history.

(56) References Cited

U.S. PATENT DOCUMENTS

| | | | |
|---|---|---|---|
| 2,658,742 A | 11/1953 | Suter et al. | |
| 2,862,095 A | 11/1958 | Scofield | |
| 3,785,778 A | 1/1974 | Burstein et al. | |
| 3,962,561 A | 6/1976 | Maitenaz | |
| 4,039,292 A | 8/1977 | Morini et al. | |
| 4,071,738 A | 1/1978 | Jenn et al. | |
| 4,089,088 A | 5/1978 | Konczalski | |
| 4,098,007 A | 7/1978 | Davis et al. | |
| 4,098,567 A | 7/1978 | Hubbert | |
| 4,138,220 A | 2/1979 | Davies et al. | |
| 4,292,501 A | 9/1981 | Maitenaz | |
| 4,302,661 A * | 11/1981 | Perry, Jr. | 219/398 |
| 4,330,503 A | 5/1982 | Allaire et al. | |
| 4,437,451 A | 3/1984 | Wysong | |
| 4,494,525 A | 1/1985 | Albertsen | |
| 4,544,526 A | 10/1985 | Billings | |
| 4,643,167 A | 2/1987 | Brewer | |
| 4,654,508 A | 3/1987 | Logel et al. | |
| 4,740,258 A | 4/1988 | Breitscheidel | |
| 4,831,237 A * | 5/1989 | Gelineau | 219/398 |
| 4,843,841 A | 7/1989 | Vork et al. | |
| 4,985,211 A | 1/1991 | Akiyama et al. | |
| 5,442,994 A * | 8/1995 | Parker | 99/468 |
| 6,058,924 A | 5/2000 | Pool, III et al. | |
| 6,131,559 A | 10/2000 | Morris et al. | |
| 6,213,118 B1 | 4/2001 | Adcock et al. | |
| 6,250,296 B1 | 6/2001 | Norris et al. | |
| 6,437,294 B2 | 8/2002 | Allera et al. | |

(Continued)

*Primary Examiner* — Avinash Savani
(74) *Attorney, Agent, or Firm* — Meroni & Meroni, P.C.; Charles F. Meroni, Jr.; Christopher J. Scott (57) ABSTRACT

A catalytic conversion unit treats emissions emanating from a cooking event. The unit comprises a housing to contain the other components that connects either directly or through the use of ancillary components to the oven cavity of a residential range, or oven. Contained within the housing are an electric heating element and a catalyst unit. The housing may connect to additional components to complete the venting of the exhaust to the atmosphere. The electric heating element is arranged so that infrared radiation from the hot surface of the element is visible by the inlet face of the catalyst. The power output of the heater is sized so that the catalyst reaches a minimum operating temperature to initiate the catalytic reaction in advance of the temperature increase in the air coming from the cavity.

18 Claims, 7 Drawing Sheets

U.S. PATENT DOCUMENTS

| | | |
|---|---|---|
| 6,644,178 B2 | 11/2003 | Clark |
| 6,780,225 B2 | 8/2004 | Shaw et al. |
| 7,308,852 B2 * | 12/2007 | Kaminaka et al. .............. 99/476 |
| 2001/0052515 A1 | 12/2001 | Allera et al. |
| 2002/0059930 A1 | 5/2002 | Schmidmayer et al. |
| 2003/0218058 A1 | 11/2003 | Shaw et al. |
| 2005/0011887 A1 | 1/2005 | Kim |
| 2005/0039613 A1 * | 2/2005 | Kaminaka et al. .............. 99/476 |

* cited by examiner

CATALYTIC CONVERTER UNIT AND METHOD FOR TREATING COOKING EMISSIONS

BACKGROUND OF THE INVENTION

1. Field of the Invention

The present invention relates to a catalytic converter unit for use in combination with an oven for treating odiferous emissions that may occur during a cooking event. The present invention further relates to a correspondingly equipped oven, as well as certain methodology for enhancing the efficiency of emission treatment.

2. Description of Related Art

In today's closed up and environmentally controlled houses it is not always desirable to be able to smell the resulting odors from foods being cooked in a residential oven. Certain foods, fish for example emit certain amine compounds that are noisome while greasy foods such as bacon or other high fat meats emit odors that may initially be acceptable, but impart a rancid like impression as they linger in the air. Some of the more pertinent prior art relating to means for treating cooking emissions, including ovens having catalytic conversion units and the like are briefly described hereinafter.

U. S. Pat. No. 2,862,095 ('095 Patent), which issued to Scofield, discloses certain Vapor Treating Means. The '095 Patent teaches certain hardware usable in combination with an oven compartment forming part of a domestic cooking range and having a substantially open front and a door for substantially closing said front, which door partially seals the front when closed. The hardware comprises heating equipment for the compartment; a vapor passage having an inlet and an outlet in the compartment; vapor purifying means is said passage; a vent arranged for venting purified vapor from the passage into the ambient atmosphere; a vapor blower for moving vapor from the compartment through the passage and through the vapor purifying means therein to said vent and also back to the compartment; means for simultaneously controlling the degree of opening of the vent and the degree of heating provided by the heating equipment; and means associated with said passage for lowering the pressure of circulated vapor, inside the compartment, below the normal pressure of the ambient atmosphere at all degrees of opening of the vent.

U.S. Pat. No. 3,785,778 ('778 Patent), which issued to Burstein et al, discloses a Smoke Eliminating Device. The '778 Patent teaches a device for eliminating combustible, carbon containing vapors or smoke comprising a device having an inlet hood capable of collecting smoke from a broiler or other cooker. The device has an outlet and a passageway between the hood and the outlet. In this passageway is a cellular, catalyst-coated refractory block threaded with high resistance electrical wire for heating the block cells. An impeller associated with the passageway draws the vapors through the heated block cells for combustion of the vapors and then forces them on through the outlet.

U.S. Pat. No. 4,039,292 ('292 Patent), which issued to Morini et al, discloses a Catalytic Converter for Oven Fumes. The '292 Patent teaches a catalytic oxidation unit of the type used for oxidizing fumes from ovens and the like comprising a metallic housing providing a tubular body portion with spaced shoulders in the through passage and a block of cellular ceramic material therebetween. One of the spaced shoulders is provided by an apertured front wall on the housing, and the block of ceramic material is biased against this front wall shoulder by resiliently compressible means acting between the block and the other shoulder. The ceramic material block has an oxidation catalyst on the walls of the cells thereof which is effective to oxidize organic materials in the fumes passing through the metallic housing and the block of ceramic material therewithin.

U.S. Pat. No. 4,089,088 ('088 Patent), which issued to Konczalski, discloses a Thermal Regeneration and Decontamination Apparatus and Industrial Oven. The '088 Patent teaches an air-permeable reactor medium of large surface area and high thermal capacity, coated with a catalyst, is cycled along a closed path across a first duct carrying an air stream laden with oxidizable contaminants and a second duct carrying a stream of fresh air, enabling contaminants in the first air stream to be oxidized to innoucuous byproducts, releasing heat which is transferred to the fresh air in the second duct, the reaction medium moving at a variable speed which is a function of the temperature of one of the air streams; considerable improvement in the efficiency of an industrial oven may therefore be achieved by positioning the reactor medium to exchange heat between an incoming stream of fresh air and a stream of hotter exhaust gas so that the temperature of fresh air delivered elsewhere to the oven may be controlled without having to rely on dampers and mixtures of air volumes with inherent damper malfunctions or mis-metering; also a second burner may be eliminated because of the manner in which the reactor medium is utilized to exchange heat.

U.S. Pat. No. 4,138,220 ('220 Patent), which issued to Davies et al, discloses an Apparatus for Catalytic Oxidation of Grease and Fats in Low Temperature Fumes. The '220 Patent teaches a method and apparatus for catalytically oxidating grease, fats, oils and/or other hydrocarbons in fumes rising from a source thereof. In particular, grease and odor-laden air streams, i.e. hydrocarbon-laden air streams, emanating from a source such as a cooking grill or the like are heated to a temperature at which passage over a catalyst causes flameless oxidation of the organic material in the air stream at a temperature below combustion temperature, the organic material being converted essentially to carbon dioxide and water, with release of at least some heat energy. The oxidized and heated air stream is ducted in countercurrent relation or in identically parallel direction, to the relatively cooler hydrocarbon-laden air stream which is being ducted toward the catalyst, heat exchange from the oxidized air stream to the hydrocarbon-laden air stream thereby occurring to at least partially heat the hydrocarbon-laden air stream. Additional heat energy can also be introduced if necessary into the unoxidized air stream prior to passage over the catalyst in order to raise the temperature of the airstream to the operating temperature of the catalyst.

U.S. Pat. No. 4,330,503 ('503 Patent), which issued to Allaire et al, discloses a Wood Burning Stove. The '503 Patent teaches an improved wood burning stove employing a combustion chamber and a flue for removing exhaust therefrom and also a catalytic converter means for oxidizing oxidizable species in the exhaust. A passageway is provided for bypassing the exhaust around the catalytic converter means, the passageway being controlled by a bypass damper for controlling access to the passageway for varying impedance otherwise presented to the exhaust by the converter, for example, during the addition of fuel to the stove. Such an arrangement minimizes back pressure caused by the converter means.

U.S. Pat. No. 4,654,508 ('508 Patent), which issued to Logel et al, discloses an Electro-Domestic Oven having a Catalytic Reactor with a Depression Baffle. The '508 Patent teaches an electric domestic oven comprising an air exhaust channel above the exit from a catalytic reactor. A depression baffle is located in the air exhaust channel to provide a suction orifice in the area of the catalyser unit to draw cooling and cleaning gases from the cooking compartment. The depression baffle has a curved upstream portion and a ramp-shaped downstream portion. A deflector may be placed above the baffle in the channel.

U.S. Pat. No. 4,831,237 ('237 Patent), which issued to Gelineau, discloses a Cooking Oven with Self-Cleaning Pyrolysis System. The '237 Patent teaches an electric oven with self-cleaning pyrolytic system, includes a catalyst for smoke or fumes, at least one vault resistance and one sole resistance of standard values, wherein the oven further comprises means for powering at the beginning of a pyrolysis operation, simultaneously and exclusively the vault resistance and a part of the sole resistance, so that the power supplied by this part of the sole resistance is lower than the power supplied by the vault resistance, and wherein the catalyst is produced from a material that allows its activation prior to the saturation of the oven by smoke or fumes, exclusively through the convection heat passing into a pipe housing the catalyst from the oven, and wherein means are provided for powering other resistances after the beginning of activation of the catalyst, in order to reach the pyrolysis temperature.

U.S. Pat. No. 5,927,265 ('265 Patent), which issued to McKee et al, discloses a Recycling Cooking Oven with Catalytic Converter. The '265 Patent teaches a recycling cooking oven providing a substantially closed environment. The oven includes a thermal plenum for supplying a stream of hot air into a cooking chamber and for receiving a stream of hot air from the cooking chamber, the thermal plenum maintaining a reservoir of hot air therein. The cooking chamber of the oven supplies a stream of hot air into the thermal plenum and receives a stream of hot air from the thermal plenum, the cooking chamber cooking foods therein at least partially with a stream of hot air and such foods adding oxidizable components to the hot air of the stream. A blower and ducting cause the stream of hot air to circulate in substantially a continuous travel path including the thermal plenum and the cooking chamber. A catalytic converter is disposed in the travel path of the stream of hot air, downstream of the cooking chamber and upstream of the thermal plenum, for flamelessly oxidizing oxidizable components in the hot air of the stream leaving the cooking chamber, thereby both to remove them from the hot air of the stream and to release at least some additional heat energy into the hot air of the stream.

U.S. Pat. No. 6,058,924 ('924 Patent), which issued to Pool, III et al., discloses a Vented Recycling Oven with Separate Catalytic Converter. The '924 Patent teaches a recycling cooking oven for cooking food at least in part by hot air flow and providing a substantially closed but vented environment includes a cooking chamber for receiving a stream of hot air from an upstream thermal plenum via a plurality of openings in the cooking chamber, the cooking chamber cooking food therein at least partially with hot air from the plurality of openings and the cooking of such foods adding oxidizable components to the hot air. A blower circulates the stream of hot air in substantially a continuous travel path including the thermal plenum, the plurality of openings and the cooking chamber. A main catalytic converter is disposed in the continuous travel path for flamelessly oxidizing the oxidizable components leaving the cooking chamber. A vent communicating with ambient atmosphere and the main catalytic converter diverts an auxiliary vent stream of hot air from the main catalytic converter into the vent; and an auxiliary catalytic converter is disposed in the vent, downstream of the main catalytic converter, for flamelessly oxidizing oxidizable components in the hot air of the auxiliary vent stream passing through the vent, thereby to further remove oxidizable components from the hot air of the auxiliary vent stream and so release a relatively clean auxiliary vent stream of hot air from the vent into the ambient atmosphere.

U.S. Pat. No. 6,131,559 ('559 Patent), which issued to Norris et al, discloses a Convection Oven with Smoke Management Means. The '559 Patent teaches a convection heating apparatus with smoke and grease management means and an improved temperature controlled gas delivery system. The apparatus includes an exterior cabinet, an interior chamber and intermediate walls disposed between the exterior cabinet and interior chamber such that an intermediate cavity is provided between the interior chamber and intermediate walls and an outer cavity is provided between the exterior cabinet and intermediate walls. The apparatus further includes a product support, preferably a conveyor, disposed in the interior chamber. A blower for circulating temperature controlled gas into said interior chamber is also provided which is in fluid communication with at least one duct (preferably a plurality) having a jet plate with orifices positioned to direct temperature controlled gas toward the product support. A second blower is provided for circulating air through the outer cavity and intermediate cavity to cool the exterior cabinet walls and interior chamber walls. An improved air delivery duct is provided having a dual taper resulting in uniform distribution of the temperature controlled gas to a food product. An air filtering system is also provided comprising a perforated filter plate or louvers and/or catalytic converter disposed in the temperature controlled gas return path.

U.S. Pat. No. 6,437,294 ('294 Patent), which issued Allera et al., discloses a Pyrolytic Self-Cleaning Oven. The '294 Patent teaches a pyrolytic self-cleaning oven having a catalytic composition positioned in the oven cavity or exhaust gas passage in order to complete the combustion and/or the oxidation of gases produced by a process carried out inside the oven. The catalytic composition is supported by a ceramic coating on a metal wire. The metal wire is electrically connected to a control system of the oven for controlling the cooking and/or pyrolytic cleaning process. The catalytic composition carried on the metal wire may be part of a net-shaped catalytic element.

U.S. Pat. No. 6,780,225 ('225 Patent), which issued to Shaw et al, discloses a Reflow Oven Gas Management System and Method. The '225 Patent teaches a reflow solder oven gas management system which introduces an inert gas into and removes contaminated gas from a reflow oven tunnel (42) at predetermined points (6, 8) to influence the oven tunnel gas flow and to dilute and expel excess oxygen. The contaminated gas is ducted to a flux separation system (34) to be cleaned, for example remove flux vapors, and returned in part to the tunnel (42) for recirculation and with the remainder routed to end baffle boxes (54) for tunnel end pressurization and exhaust. The system has sufficient pressure to supply end baffle boxes (54) with clean gas to create a gas barrier to effectively seal off the tunnel ends from air infiltration or migration into the tunnel making the system insensitive to external pressure and/or temperature variations. The invention also includes alternative embodiments, low flow oxygen bleed valves (72) to maintain low oxygen content in the oven process tunnel.

United States Patent Application Publication Number US 2002/0059930, which was authored by Schmidmayer et al, describes a catalytic converter for use in an oven comprising at least two sub-catalysts connected in series. One of the sub-catalysts includes a catalytically active metal layer as its active surface to improve the efficiency of the catalytic converter with respect to the elimination of unpleasant odors. The one sub-catalyst includes a metal oxide as its active surface.

At least one other sub-catalyst includes, as its active surface, a metal layer selected from elements in groups 8 to 10 of the periodic table.

SUMMARY OF THE INVENTION

This invention is essentially a device that allows the user to destroy via the use of a catalyst the odors that come from the cooking process so as to improve the cooking experience. It is accordingly a primary object of the invention to provide a catalytic conversion unit for use in combination with an oven that overcomes the shortcomings or disadvantages otherwise associated with state of the art catalytic conversion units subjected to variable temperatures within a convective environment. The device's purpose is to substantially reduce the odors emitted to a room by a residential oven during the cooking process. It uses a high surface area, low thermal mass catalyst to break down the myriad of complex organic molecules that are released during the cooking of foods into simpler molecules.

The device consists of a housing to contain the other components that connects either directly or through the use of ancillary components to the oven cavity of a residential range, or oven. Contained in the housing are an electric heating element and a catalyst unit. The housing connects to additional components to complete the venting of the exhaust to the atmosphere.

The electric heating element is arranged so that infrared radiation from the hot surface of the element is visible by the inlet face of the catalyst. The power output of the heater is sized so that the catalyst reaches a minimum operating temperature to initiate the catalytic reaction in advance of the temperature increase in the air coming from the cavity.

The catalyst unit is comprised of a layered metallic substrate coated with a high surface area aluminum oxide coating that has been impregnated with catalytically active elements. The substrate layers are processed so that they form a series of channels through which the air flows. The channels may be straight or angled relative to the direction of air flow. The number of channels per unit of face area can range from 40 to 350 channels/$in^2$. The number of channels used will depend upon the volume of air flowing from the cavity, the amount of cross sectional area available, and the amount of resistance to flow that the cavity can tolerate without adversely affecting the cooking performance.

The aluminum oxide coating is intended to greatly increase the total surface area on which to distribute the catalytically active elements. It is a mixture of two aluminum oxide phases, namely the gamma and boehmite phases. Other elemental oxides may be present in lesser amounts to act as thermal stabilizers or to enhance the effectiveness of the catalytically active elements. The oxides are prepared in a manner well known to those skilled in the art and are applied to the substrate after the geometry of the channels has been impressed into the metal layer. The total amount of aluminum oxide applied ranges from 0.5 to 2.0 $g/in^3$ of total substrate volume.

The catalytically active elements are the materials that act upon the emissions from the cooking process to break them down in to simpler forms. The actual choice of which elements to use depends upon the nature of the expected foods that will be cooked, the temperature at which the catalyst is intended to operate and the degree of conversion that is required. Elements from the platinum group metal series are the most common for this work either singly or in combination with each other in various ratios of one to the other. However, non-PGM elements from Groups IVA to IIB of the periodic table are also candidates depending upon the specified operating parameters for the device. For the PGM elements the total amount on each catalyst can range from 10 to 75 $g/ft^3$ of total substrate volume. The application of the catalytically active materials to the substrate has been well documented and is known to those skilled in the art. While the present embodiment of the invention utilizes a metallic substrate as described above the use of other substrate forms such as wire mesh, expanded metal, metal foam or ceramics is within the scope of the invention.

Depending upon the desires of the oven manufacturer the device may be energized whenever the oven is heated or it may be on a switch so that the user controls the function. For either case when the device is to be used it operates in the following manner. Power is first applied to the heater element so that the surface of the heater emits infrared radiation. This radiation is seen by the face of the catalyst which absorbs it and heats up under its influence. It is desirable that the catalyst be heated to a temperature of between 450-900° F. It is also desirable that the catalyst reach this temperature in a time of less than 5 minutes from the application of power to the heater element.

When the catalyst is at a temperature within this range organic molecules from the foods being cooked that have made their way from the oven cavity and into the device they will pass by the heater element and reach the catalyst. At the catalyst they will be adsorbed onto the surface of the catalyst where in the proximity to the catalytically active elements they are broken down and their atoms of carbon and hydrogen are combined with oxygen to form simpler molecules. The simpler molecules then desorb from the surface of the catalyst back into the air stream and pass out of the device.

BRIEF DESCRIPTION OF THE DRAWINGS

Other features of my invention will become more evident from a consideration of the following brief description of patent drawings.

DETAILED DESCRIPTION OF THE PREFERRED EMBODIMENT

The essential purpose of the device according to the present invention is to substantially reduce the odors emitted to a room by a residential oven during the cooking process. The device uses a high surface area, low thermal mass catalyst to break down the myriad of complex organic molecules that are released during the cooking of foods into simpler molecules. The device consists of a housing 14 to contain other components, which housing connects either directly or through the use of ancillary components to the oven cavity of a residential range, or oven. Contained in the housing are an electric heating element or thermal radiation source 16 and a catalyst unit or catalyst element 18. The housing 14 connects to additional components to complete the venting of the exhaust to the atmosphere.

The electric heating element or thermal radiation source 16 is arranged so that infrared radiation from the hot surface of the element is visible by the inlet face of the catalyst element 18. The power output of the heater is sized so that the catalytic environment reaches a minimum operating temperature to initiate the catalytic reaction in advance of the temperature increase in the air coming from the cavity. The catalyst unit comprises a layered metallic substrate coated with a high surface area aluminum oxide coating that has subsequently been impregnated with catalytically active elements.

The substrate layers are processed so that they form a series of channels 26 through which the air flows. The channels 26 may be straight or angled relative to the direction of air flow. The number of channels 26 per unit of face area can range from 40 to 350 channels/in$^2$. The number of channels 26 used will depend upon the volume of air flowing from the cavity, the amount of cross sectional area available, and the amount of resistance to flow that the cavity can tolerate without adversely affecting the cooking performance.

The aluminum oxide coating is intended to greatly increase the total surface area on which to distribute the catalytically active elements. It is a mixture of two aluminum oxide phases, namely the gamma and boehmite phases. Other elemental oxides may be present in lesser amounts to act as thermal stabilizers or to enhance the effectiveness of the catalytically active elements. The oxides are prepared in a manner well known to those skilled in the art and are applied to the substrate after the geometry of the channels has been impressed into the metal layer. The total amount of aluminum oxide applied ranges from 0.5 to 2.0 g/in$^3$ of total substrate volume.

The catalytically active elements are the materials that act upon the emissions from the cooking process to break them down in to simpler forms. The actual choice of which elements to use depends upon the nature of the expected foods that will be cooked, the temperature at which the catalyst is intended to operate and the degree of conversion that is required. Elements from the platinum group metal series are the most common for this work either singly or in combination with each other in various ratios of one to the other.

However, non-PGM elements from Groups IVA to IIB of the periodic table are also candidates depending upon the specified operating parameters for the device. For the PGM elements the total amount on each catalyst can range from 10 to 75 g/ft$^3$ of total substrate volume. The application of the catalytically active materials to the substrate has been well documented and is known to those skilled in the art. While the present embodiment of the invention utilizes a metallic substrate as described above the use of other substrate forms such as wire mesh, expanded metal, metal foam or ceramics is within the scope of the invention.

Depending upon the desires of the oven manufacturer the device may be energized whenever the oven is heated or it may be on a switch so that the user controls the function. For either case when the device is to be used it operates in the following manner. Power is applied to the heater element or thermal radiation source 16 so that the surface of the heater emits infrared radiation. This radiation is seen by the face of the catalyst element 18 which absorbs it and heats up under its influence. It is desirable that the catalyst element be heated to a temperature of between 450-900° F. It is also desirable that the catalyst element 18 reach this temperature in a time of less than 5 minutes from the application of power to the heater element or thermal radiation source 16.

When the catalyst element is at an operative catalytic temperature (definable by the foregoing range) organic molecules from the foods being cooked that have made their way from the oven cavity and into the device will pass by the heater element or thermal radiation source 16 and reach the catalyst element 18. At the catalyst element site, the emissions will be adsorbed onto the surface of the catalyst where in the proximity to the catalytically active elements they are broken down and their atoms of carbon and hydrogen are combined with oxygen to form simpler molecules. The simpler molecules then desorb from the surface of the catalyst back into the air stream and pass out of the device.

State of the art ovens offering self-cleaning features typically contain a small catalyst, either wire mesh based or ceramic honeycomb, in the exhaust piping from the oven cavity to the room. The catalyst partially reduces the smoke and odors resulting from the pyrolysis of the spilled and baked on food soils. When the user selects the self-cleaning feature the oven heats up to a temperature of around 800° F. (depending upon the manufacturer) in about 30-45 minutes. As the air passes through the catalyst it gains heat from the air and so eventually reaches the point where the catalytic reaction is initiated.

However, because of the overall thermal mass of the oven the temperature of the catalytic environment often lags behind that of the oven cavity and often there is an emission of smoke and odor to the room that the catalyst has no effect on because it is still too cold. It is this thermal lag phenomenon combined with the requirement for the catalyst to be at temperatures greater than 450° F. to function that prevents the existing catalyst from being able to control normal cooking odors. A further limitation of this system is that primarily for cost control reasons the volume of catalyst is small which further limits its ability to control odors.

Commercial rapid or speed cook ovens do use a catalyst to control the emissions of grease particulates and odors from the oven. So-called high speed convection and/or microwave ovens operate at temperatures which are close to or above the 450° F. catalyst initiation temperature by heating the volume of air in the oven as it circulates. Electric heater elements in these ovens are sized to heat the volume of air inside the oven. Each time the oven door is opened cooler room air is introduced which causes a drop in the catalyst temperature until the heaters can compensate for the temperature loss. While the catalyst element in these units contain sufficient volume to meet certain agency guidelines, because the air in them circulates many times through the catalyst they too would be undersized if they had to process the same volumetric flow of air in a single pass and still reach a performance level where odors are controlled.

This catalytic conversion unit 10 of the present invention recognizes the disadvantages of both of these examples and offers a solution to the problem of odor control during cooking. From the existing applications of catalyst to the control of odors it was concluded that more catalyst volume relative to the amount of air processed coupled with a method of heating the catalyst independently of the main oven cavity would be the best approach to gaining the level of control desired.

Rather than attempting to heat the air coming from the oven cavity that subsequently flows through the catalyst is was decided to utilize infrared energy to raise the temperature of the catalyst directly. Given that the preferred form of the catalyst substrate is a metal foil and that the catalyst coating has a dark, non-reflective surface the rate of heat transfer is high with infrared energy. A tubular thermal radiation source 16 was designed that operates at a sheath temperature below 1,100° F. The heater is located away from the inlet face of the catalyst so that the maximum sightline angle from the surface of the heater to the catalyst is between 5° and 30°. The power rating of the heater is selected to reach the catalyst operating temperature in the amount of time desired which should be on the order of 2-5 minutes after application of power to the heater.

The size of catalyst element 18 required to meet the performance levels desired is governed by the relationship between the volumetric flow of air though the catalyst and the volume of the catalyst element 18. While the minimum size of the catalyst element 18 can be governed by this relationship the maximum size is an economic decision as either the cost of the catalyst or the size of the housing to contain it are normally critical design parameters of the oven unit. This invention contains sufficient catalyst volume to control odors to a high degree in a package that is approximately 4" wide by 1.5" high. This allows it to fit on top of the oven cavity and still have clearance between it and the lower surface of the range top heating elements.

Figure 8:
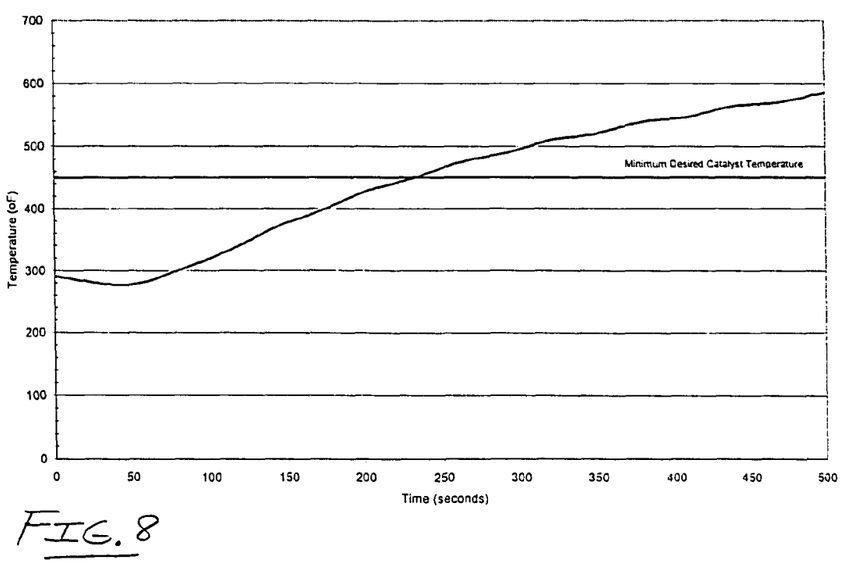
FIG. 8 is a graphical depiction of catalyst temperature as a function of time showing length of time required to reach a minimum desired catalyst temperature.

The heat up performance data was gathered by placing a thermocouple at the outlet face of the catalyst and recording its values versus time using an automatic data recorder. The oven was set to a bake temperature of 450° F. and allowed to begin heating towards that point. When the oven had reached a temperature of 300° F. the catalyst heater was switched on. This simulates the preferred operation scenario where the user turns on the catalyst unit just before the food is placed into the oven. The data obtained from this trial is shown graphically in FIG. 8.

Odor control performance was determined using a Flame Ionization Detector (FID) which is a common instrument for measuring the concentration of hydrocarbons in an air stream. It was desired to use as a reference hydrocarbon one that was easily quantifiable, consistent in composition and would have an obvious odor in the room if the catalyst was not eliminating it from the oven exhaust. Vinegar was eventually selected as it met all the criteria. Household vinegar is a mixture of water and acetic acid to a concentration of 5 weight %.

The catalyst used had dimensions of 3.5"×1.5"×1" and was comprised of 22 layers of corrugated metal foil having a zigzag pattern. The catalyst coating was comprised of platinum on an alumina washcoat. The amount of platinum applied was at the rate of 30 g/ft$^3$. In order to determine the uncontrolled emissions from the oven while keeping the airflow patterns consistent a blank, uncoated metal foil substrate with the same cell pattern and number of layers was used in place of the catalyst. The experimental procedure was as follows: The oven was brought to a temperature of 450° F. and the catalyst heater was allowed to reach its equilibrium temperature of 600° F. The FID was warmed up and calibrated per its operating instructions. A volume of 30 ml of household white vinegar was measured out and placed on a clean 13"×9" non-stick cookie sheet. The cookie sheet was placed into the oven, the FID data logger was initiated and a stopwatch was started. Data was collected for a period of 10 minutes. The results of the trials are shown graphically in FIG. 9.

The catalytic conversion unit 10 of the present invention may be further understood by referring to the structurally illustrative drawings in FIGS. 1-7, inclusive. As may be gleaned from the foregoing, the present invention may be said to embody a catalytic conversion unit 10 for use in combination with a cooking chamber 11 as most typically housed within an oven 12 (or oven/range). The catalytic conversion unit 10 of the present invention is generally illustrated and referenced in FIGS. 1-4, and 7; and a cooking chamber 11 of an exemplary, generic cooking oven 12 is illustrated and referenced in FIGS. 3, 4, and 7.

As earlier stated, the catalytic conversion unit 10 of the present invention is designed with a view toward remedying temperature maintenance problems otherwise associated with state of the art catalytic conversion units and the attendant removal of unpleasant odors emanating from a cooking chamber. In other words, state of the art catalytic conversion of emissions resulting from cooking events is hampered by variable temperatures within cooking chambers and oven-based catalytic conversion units.

Figure 3:
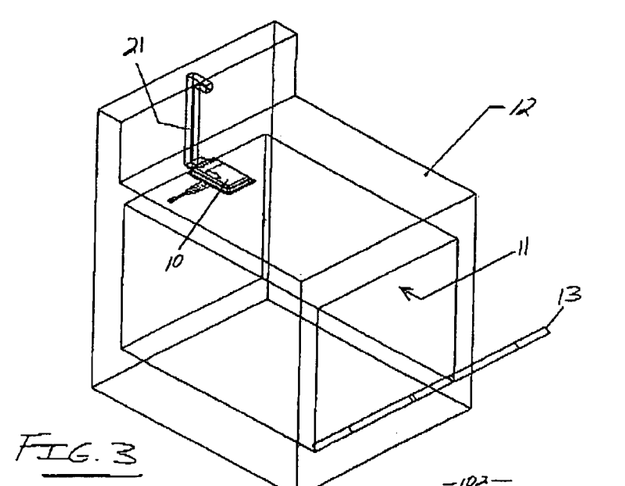
FIG. 3 is a top perspective skeletal type depiction of a generic oven/range showing the catalytic conversion unit in assembled relation with the oven/range.
Figure 4:
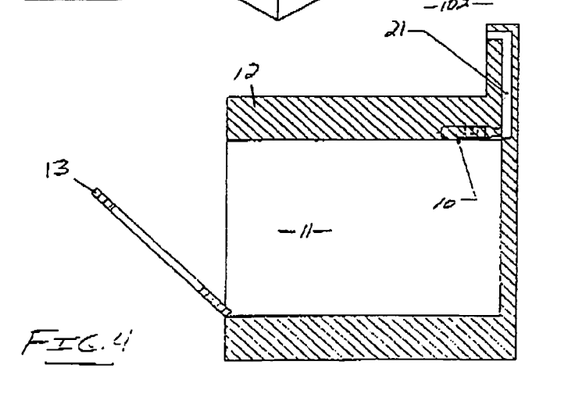
FIG. 4 is a cross-sectional side view of an oven/range outfitted with the catalytic conversion unit of the present invention.

Variable temperatures within typical cooking chambers and associated catalytic conversion units are most readily exhibited when the user opens the chamber inlet or oven door as generally depicted in FIGS. 3 and 4. The material to be cooked, for example, is usually placed inside the cooking chamber 11 after an oven preheat episode. Further, the user may periodically check the status of the cooking event by opening the oven door 13 and visually inspecting the cooking material(s). The opening of the chamber inlet or oven door 13, in any event, allows air external to the cooking chamber (typically at room temperature) to enter the cooking chamber 11 and mix with heated air inside the cooking chamber 11 (typically at elevated temperatures). This type of event markedly affects the maintenance of a consistent temperature within the cooking chamber 11 and catalytic conversion unit.

To be effective at removing odors and/or treating cooking emissions, it is noted that catalytic conversion units work best when maintained at a consistent operative temperature or at a preferred operating catalytic temperature. In other words, if the catalyst of a conversion unit is not kept at a proper operative temperature, it fails to properly and effectively convert chemicals passing therethrough. This often results in the passing of unpleasant aromatics or odors (from improperly or ineffectively converted odor-causing chemicals or cooking emissions) from the cooking chamber during a cooking event. To overcome this problem, the catalytic conversion unit 10 of the present invention is designed to maintain the operative temperature of the catalytic element or the active catalytic environment of the catalyst irrespective of whether the temperature inside the cooking chamber 11 is varied.

Figure 1:
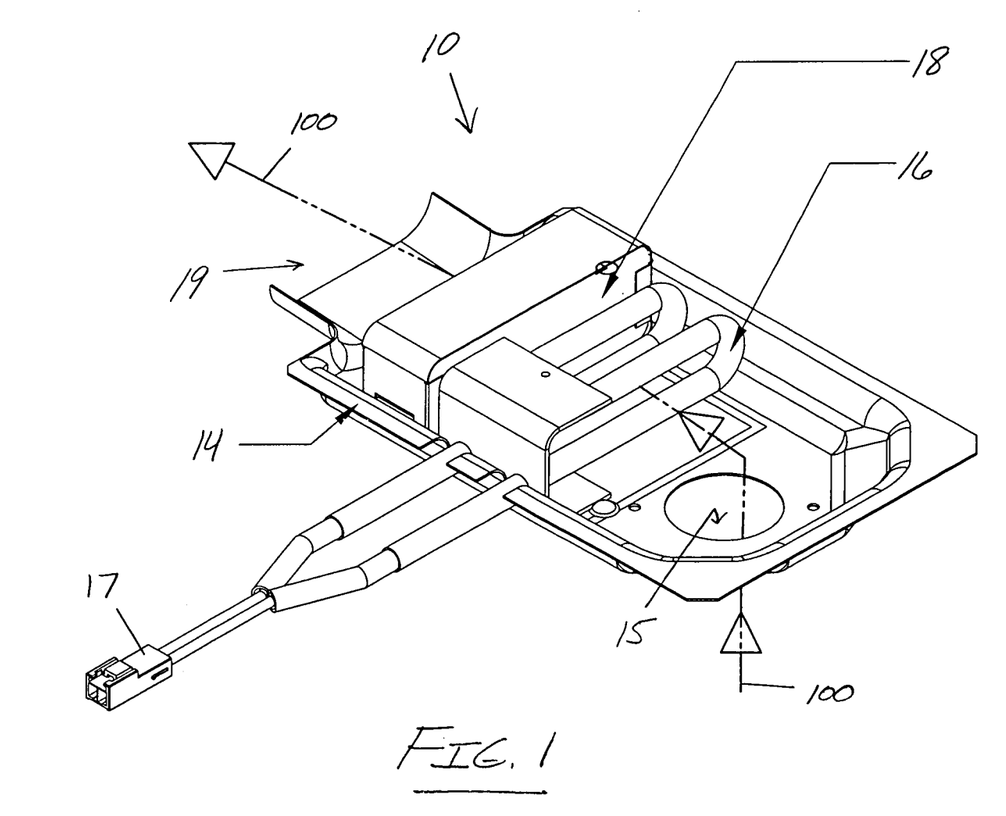
FIG. 1 is a top perspective type depiction of the catalytic conversion unit of the present invention with a top portion of the housing removed to reveal otherwise hidden structure.
Figure 2:
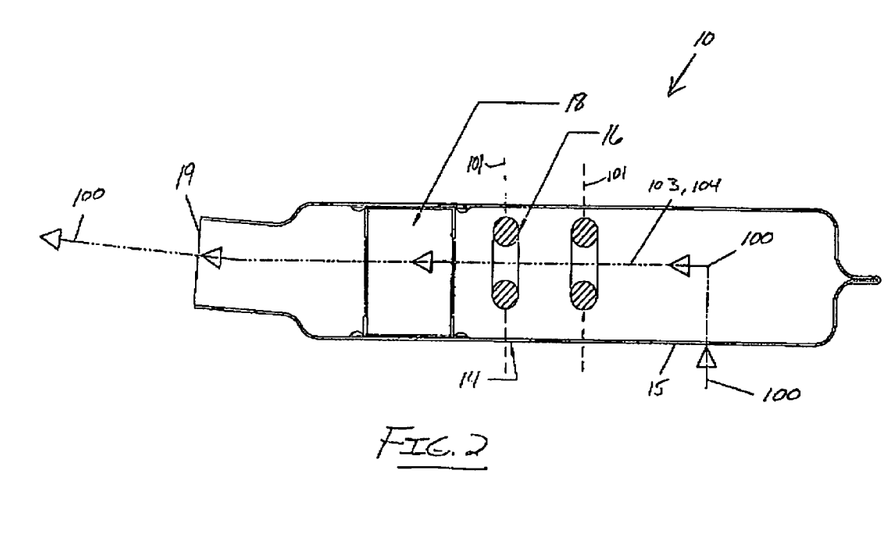
FIG. 2 is a cross-sectional side view of the catalytic conversion unit of the present invention as sectioned through looped portions of the thermal radiation source.
Figure 5:
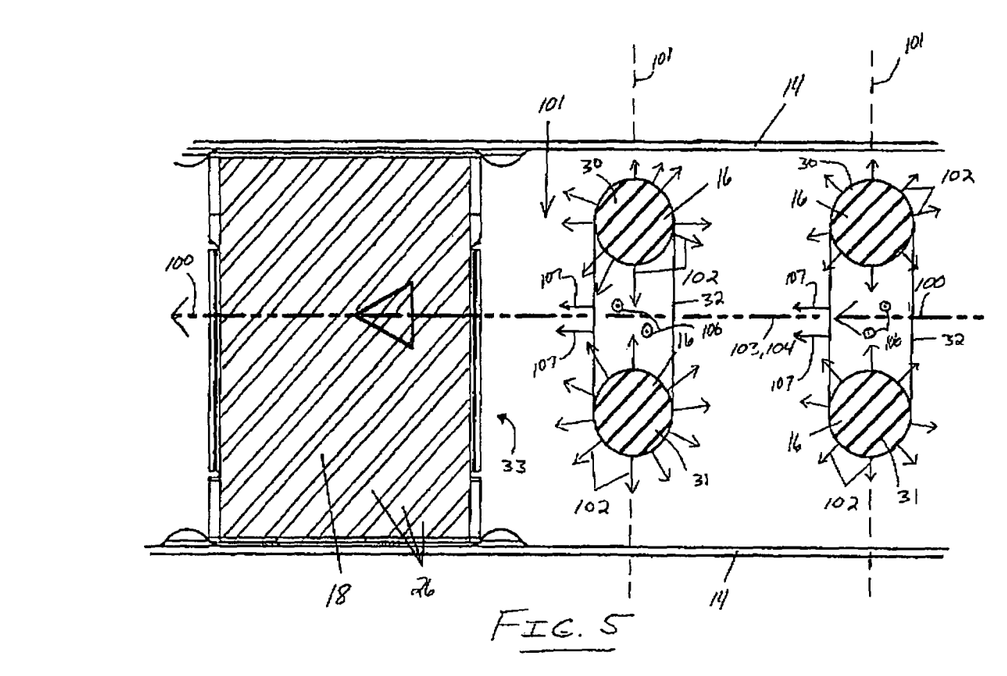
FIG. 5 is an enlarged, fragmentary type depiction of the catalytic element and thermal radiation source(s) of the present invention showing emission path through the element and source(s).
Figure 6:
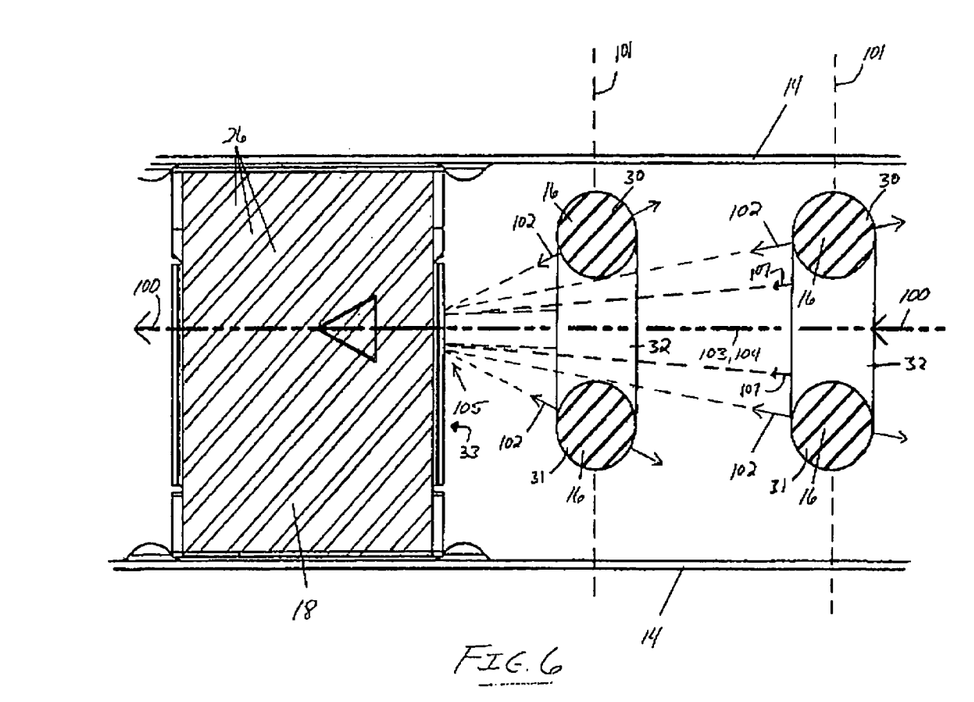
FIG. 6 is an enlarged, fragmentary type depiction of the catalytic element and thermal radiation source(s) of the present invention showing focused radiation energy transfer upon the catalytic element as directed from the thermal radiation source(s).
Figure 7:
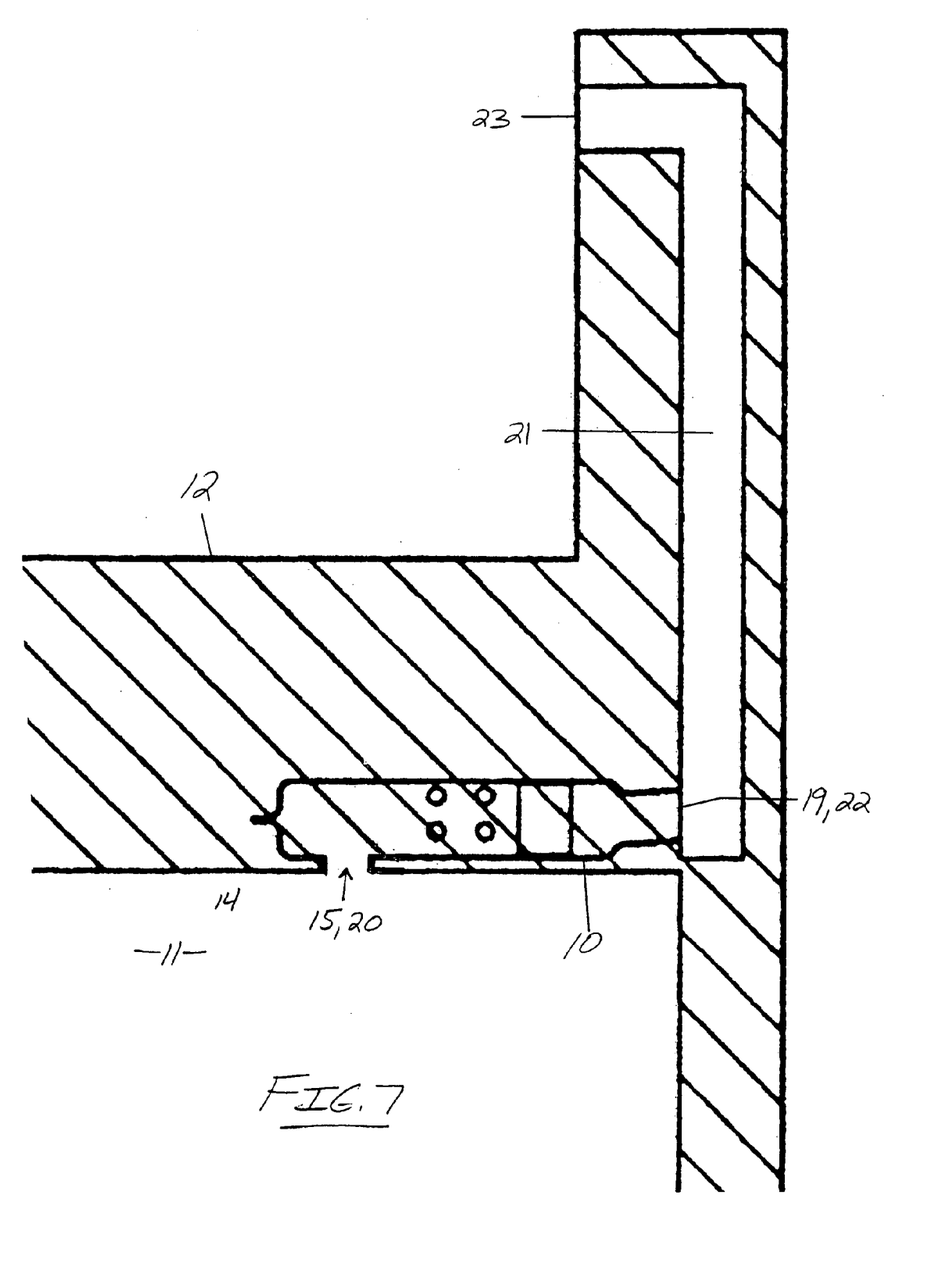
FIG. 7 is an enlarged, fragmentary upper right section of the oven/range otherwise depicted in FIG. 4, showing the structures defining the emission pathway in more detail.
Figure 9:
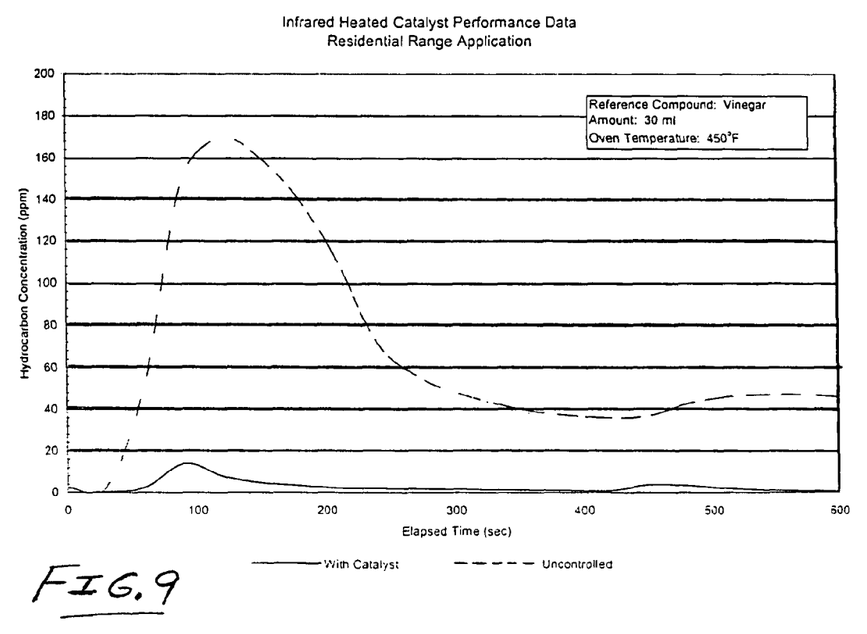
FIG. 9 is a graphical depiction of hydrocarbon concentration as a function of time for an outfitted residential oven/range using a 30 mL vinegar sample and an oven temperature of 450° F.

To achieve this essential objective, the catalytic conversion unit 10 of the present invention comprises a housing 14 as referenced in FIGS. 1, 2, 5, and 6; a unit inlet 15 as referenced in FIGS. 1, 2, and 7; a thermal radiation source 16 as referenced in FIGS. 1 and 2 (communicable with an external power source via circuitry 17 as depicted and referenced in FIG. 1), a catalyst element 18 as referenced in FIGS. 1 and 2; and a unit outlet 19 as generally referenced in FIGS. 1, 2, and 9. The housing 14 essentially defined a conduit, sized and shaped for directing the emissions through the thermal radiation source 16 before entering the catalyst element 18. The catalytic conversion unit 10 may thus be viewed as a proprietary emission-treating conduit assembly for communicating a cooking chamber 11 with certain other exhausting means.

In this last regard, it is contemplated that an oven 12 outfitted with the catalytic conversion unit 10 may well comprise a cooking chamber 11 having a chamber inlet as may be defined by an oven door 13 and a chamber outlet as at 20 in FIG. 7; and an exhaust path as at 21 in FIGS. 3, 4, and 7. The exhaust path 21 may further comprise a path inlet 22 and a path outlet 23 as further referenced in FIG. 7. It is contemplated that certain impelling means (not specifically illustrated) may be outfitted upon or otherwise cooperably associated with the exhaust path 21 so as to impart an airflow and an exhausting motion (as at vector(s) 100) to chamber-emanating emissions.

The catalytic conversion unit 10 may thus communicate the cooking chamber 11 with the exhaust path 21, such that the unit inlet 15 is coupled to the chamber outlet 20 and the unit outlet 19 is coupled to the path inlet 22. The thermal radiation source 16 provides certain heat transferring means for effecting radiant heat transfer directly to or into the catalytic environment (as at 18) for maintaining a consistent or constant temperature thereof. To achieve this objective, the thermal radiation source 16 is juxtaposed adjacent the catalyst element 18 such that an open space 101 extends therebetween as generally depicted in FIG. 5. Unhindered, obstacle-free radiant heat transfer (as at vector(s) 102) is thus enabled by the juxtaposition of the catalyst element 18 or catalytic environment and the thermal radiation source 16.

The rate at which the thermal radiation source 16 radiates energy is proportional to the fourth power of its absolute temperature. This physical principle is perhaps most commonly known as Stefan's Law, and may be simply given by the following relation:

$$P = \sigma A e T^4$$

where P is the power (in watts) radiated by the source 16; σ is a constant equal to $5.67 \times 10^{-8}$ watts/m2K4; A is the surface area of the source 16 in square meters, e is the emissivity constant of the source 16; and T is the surface temperature of the source 16 in kelvins.

Referencing FIG. 7, it may be readily understood that chamber-located or chamber-emanating emissions respectively conduct through the cooking oven ensemble via the chamber outlet 20, the unit inlet 15, the thermal radiation source 16, the catalyst element 18, and the unit outlet 19. If outfitted with an exhaust path 20, the emissions continue through the path inlet 22 and path outlet 23 and are discharged as desired by the installation specifications. Notably, and central to the practice of the present invention, the catalyst element 18 may be effectively maintained at an operative catalytic temperature via radiant heat energy 102 as provided or transferred thereto by the thermal radiation source(s) 16. The temperature-maintained catalyst element 18 may well function to control or otherwise treat cooking emissions passing therethrough (as at 100) for removing unpleasant odors and the like.

In addition to the open space (as at 101 in FIG. 5), the geometry of the thermal radiation source 16 contributes to enhancing the maintenance of a consistent operative catalytic temperature. In this regard, it may be noted from an inspection of FIGS. 1, 2, 5, and 6 that the thermal radiation source 16 is preferably looped or comprises one or more looped members 25, which looped member(s) 25 have a loop axis 103 substantially collinear or coaxial with the emission path 104 through the thermal radiation source(s) 16 and the catalyst element 18. It may be further noted that the loop axis 103 is preferably normal to the catalyst element 18 for providing simultaneous, multi-directional radiant heat energy transfer 102 as generally depicted in FIG. 6.

It is believed that such structural arrangement may well function to enhance maintenance of the operative catalytic temperature. Given a plurality of looped members, radiant heat energy 102 from adjacent looped members 25 traverse through one another as generally depicted in FIG. 6. The radiant heat energy 102 from the looped members 25 function to maximize multi-directional radiant heat energy bombardment of the catalyst element 18, which bombardment may well function to enhance maintenance of the operative catalytic temperature.

The exhausting or moving emissions are thus treated by way of the thermal radiation source 16 and the catalytic element 18 as they progress through the catalytic conversion unit 10. In this regard, it is contemplated that the unit 10 supports certain novel methodology for treating emissions emanating from a cooking chamber 11. The method of treating emissions may be said to comprise the steps of (1) juxtaposing a thermal radiation source 16 adjacent a catalyst element 18; radiantly transferring heat energy 102 to the catalyst element 18 via the juxtaposed thermal radiation source 16; maintaining an operative catalytic temperature of the catalyst element 18 via the radiantly transferred heat energy 102; directing chamber-emanating emissions into the temperature-maintained catalyst element 18 from a variable temperature cooking chamber 11; and catalytically treating the directed emissions via the temperature-maintained catalyst element 18.

The step of radiantly transferring heat energy 102 to the catalyst element 18 may be said to further comprise the step of simultaneously directing multi-directional radiant heat energy 102 to the catalyst element 18 as generally depicted in FIG. 6. Before the chamber-emanating emissions are directed into the temperature-maintained catalyst element 18, the chamber-emanating emissions may be directed through the thermal radiation source 16. In this last regard, the chamber-emanating emissions may be tunnel-heat-treated while directed or guided via the housing 14 through the thermal radiation source. The multi-directional radiant heat energy 102 may be focused by way of the coaxial or orthogonally aligned looped members 25 upon the emissions as they enter into a centralized portion of the temperature-maintained catalyst element 18 as further generally depicted in Figure No. 6. and which centralized portion is referenced at 105.

While the above description contains much specificity, this specificity should not be construed as limitations on the scope of the invention, but rather as an exemplification of the invention. For example, as is described hereinabove, it is contemplated that the present invention essentially discloses a catalytic conversion unit and method for treating emissions during a cooking event taking place within a cooking chamber.

The invention may thus be said to provide a cooking oven as at 12 for catalytically treating emissions during a cooking event, which cooking oven 12 comprises in combination, a cooking chamber as at 11 and a catalytic conversion unit as at 10. The cooking chamber comprises a chamber inlet as at 13 and a chamber outlet as at 20. The catalytic conversion unit 10 is central to the practice of the present invention and may be said to preferably comprise a unit inlet as at 15, a series of (preferably U-shaped) thermal radiation sources as at 16, a block-shaped catalyst element as at 18, and a unit outlet as at 19.

Each thermal radiation source is oriented in a source plane as generally depicted at 101. The source planes 101 of each U-shaped thermal radiation source are parallel to one another. Each thermal radiation source preferably has a first (or upper) arm or portion as at 30, a second (or lower) arm or portion as at 31, and an arched portion as at 32 connecting the first and second arms or portions 30 and 31 respectively. The catalyst element preferably has a rectangular transverse cross section having a planar emission-receiving surface as at 33. Notably, the source planes 101 are parallel to the emission-receiving surface 33 for effecting variously angled radiant vectors 102 from the various portions 30-32 of the thermal radiation sources 16.

The catalytic conversion unit 10 is in communication with the chamber outlet 20 such that chamber-located emissions respectively conduct through the cooking oven. 12 through the chamber outlet 20, into the unit inlet 15, intermediate the first and second arms or portions 30 and 31 and arched portions 32 of the.thermal radiation sources 16, into the emission-receiving surface 33 of the catalyst element or environment 18, through the rectangular transverse cross section, through the unit outlet 19, and into the air space as at 102 adjacent the cooking oven 12.

The core concept of the present invention is believed to be centered in the maintenance of the catalyst element 18 at an optimum, operative catalytic temperature via radiant heat energy transfer provided by the first and second arms or portions 30 and 31 and arched portions 32 of the thermal radiation sources 16 respectively extending in the parallel source planes 101 such that the radiant heat energy thus converge toward a centralized portion 105 of the catalyst element 18 from (1) variously angled upper directions, (2) variously angled lower directions, and (3) variously angled lateral directions respectively via the (parallel) upper arms, (parallel) lower arms, and (parallel) lateral arched portions.

In this last regard, it should be noted that radiant heat may be directed as at vectors 106 (out of the page) to represent lateral energy transfer, it being noted that radiant heat energy will also have a components 107 directed at the centralized portion 105. Note also that the respective portions 30-32 are parallel given that the source planes 101 are parallel). Thus, it is contemplated that the temperature-maintained catalyst element 18 effectively controls emissions passing therethrough as at 100.

The method for treating emissions from a cooking chamber is contemplated to preferably comprise the steps of providing a block-shaped catalyst element as at 18, which element has a substantially planar emission-receiving surface as at 33. A series of (U-shaped) thermal radiation sources as at 16 are juxtaposed adjacent the catalyst element 18 in a series of source planes 101, which planes 101 are parallel to the emission-receiving surface 33. The thermal radiation sources 16 may thereafter be energized for creating radiant heat energy.

The heat energy may then be radiantly transferred toward the catalyst element 18 via the juxtaposed (U-shaped) thermal radiation sources 16 and in so doing the radiant heat energy converges toward a centralized portion 105 of the catalyst element 18 from (1) variously angled upper directions, (2) variously angled lower directions, and (3) variously angled lateral directions respectively via the series of upper arms or portions 30, the series of lower arms or portions 31, and the series of lateral arched portions 32.

An optimum, operative catalytic temperature of the catalyst element 18 may thus be maintained via the converging and radiantly transferred heat energy whereafter chamber-emanating emissions may be directed into the temperature-maintained catalyst element 18 by way of the series of U-shaped thermal radiation sources 16 from a variable temperature cooking chamber 11, and catalytically treated via the temperature-maintained catalyst element 18.

The unit may be said to essentially comprise a unit inlet, a thermal radiation source, a catalyst element, and unit outlet. The thermal radiation source and catalyst element are juxtaposed one another the unit inlet and unit outlet such that chamber-emanating emissions respectively conduct through the unit inlet, the thermal radiation source, the catalyst element, and the unit outlet. The catalyst element is maintained at a operative catalytic temperature via radiant heat energy provided by the juxtaposed thermal radiation source. The temperature-maintained catalyst element functions to treat emissions passing therethrough.

The method for catalytically treating cooking emissions may be said to comprise initial steps of: radiantly transferring heat energy into a catalytic environment via a juxtaposed thermal radiation source and maintaining an operative catalytic temperature of the catalytic environment via the radiantly transferred heat energy. These steps may be completed before placement of a cooking material into the chamber 11 thereby priming the catalytic conversion unit 10 for emission delivery. After the catalytic conversion unit is primed, cooking emissions may be directed through the temperature-maintained catalytic environment; catalytically treating via the temperature-maintained catalytic environment.

Although the invention has been described by reference to a preferred embodiment and certain novel methodology, it is not intended that the novel device and method be limited thereby, but that modifications thereof are intended to be included as falling within the broad scope and spirit of the foregoing disclosure and the appended drawings.

I claim:

1. A cooking oven, the cooking oven for catalytically treating emissions during a cooking event, the cooking oven comprising, in combination:

a cooking chamber, the cooking chamber comprising a chamber inlet and a chamber outlet; and a catalytic conversion unit, the catalytic conversion unit comprising a unit inlet, a series of thermal radiation sources, a catalyst element, and a unit outlet, each thermal radiation source being oriented in a source plane, the source planes of each thermal radiation source being parallel to one another, each thermal radiation source having an upper portion, a lower portion, and an arched portion connecting the upper and lower portions, the thermal radiation source arranged perpendicularly with respect to emission flow, the catalyst element having a rectangular transverse cross section, said transverse cross section having a planar emission-receiving surface, the source planes being parallel to the emission-receiving surface for effecting variously angled radiant vectors from the thermal radiation sources, the catalytic conversion unit being in communication with the chamber outlet such that chamber-located emissions respectively conduct through the cooking oven through the chamber outlet, into the unit inlet, intermediate the upper and lower arms and arched portions of the thermal radiation sources, into the emission-receiving surface of the catalyst element, through the rectangular transverse cross section, through the unit outlet, and into air space adjacent the cooking oven, the catalyst element being maintained at a operative catalytic temperature via radiant heat energy provided by the upper and lower portions and arched portions of the thermal radiation sources respectively extending in the parallel source planes, the radiant heat energy thus converging toward a centralized portion of the catalyst element from variously angled upper directions, variously angled lower directions, and variously angled lateral directions respectively via the parallel upper portions, parallel lower portions, and parallel arched portions, the temperature-maintained catalyst element removes odors from emissions passing therethrough.

2. The cooking oven of claim 1 comprising an exhaust path, the exhaust path comprising an exhaust path inlet and an exhaust path outlet, the catalytic conversion unit communicating the chamber outlet with the exhaust path inlet such that chamber-located emissions respectively conduct through the cooking oven via the chamber outlet, the unit inlet, the thermal radiation sources, the catalyst element, the unit outlet, the exhaust path inlet, and the exhaust path outlet.

3. The cooking oven of claim 1 wherein the catalytic conversion unit comprises an open space intermediate the thermal radiation sources and the catalyst element, the open space for enabling obstacle-free radiant heat energy transfer from the thermal radiation sources to the catalyst element, the open space thus for enhancing maintenance of the operative catalytic temperature.

4. The cooking oven of claim 3 wherein the arched portions comprise coaxial centers of curvature, the coaxial centers of curvature being normal to the emission-receiving surface of the catalyst element for providing simultaneous, multi-directional radiant heat energy transfer, said radiant heat energy transfer for enhancing maintenance of the operative catalytic temperature.

5. The cooking oven of claim 4 wherein radiant heat energy from adjacent thermal radiation sources traverse through one another, the radiant heat energy from the thermal radiation sources for maximizing multi-directional radiant heat energy bombardment of the catalyst element, the maximized multi-directional radiant heat energy bombardment for enhancing maintenance of the operative catalytic temperature.

6. The cooking oven of claim 5 wherein the catalytic conversion unit comprises a housing, the housing being sized and shaped for directing the emissions through the thermal radiation sources before entering the catalyst element, the thermal radiation sources for tunnel-heat-treating the through-directed emissions before entry into the catalyst element.

7. A catalytic conversion unit for treating emissions from a cooking chamber, the catalytic conversion unit comprising:
   at least one thermal radiation source and a catalyst element, each thermal radiation source being oriented in a source plane and having an upper portion, a lower portion, and a lateral portion connecting the upper and lower portions, the thermal radiation source arranged perpendicularly with respect to emission flow, the catalyst element having a planer emission-receiving surface, each source plane being parallel to the emission-receiving surface for effecting variously an led radiant vectors from each thermal radiation source each thermal radiation source being juxtaposed adjacent the catalyst element such that chamber-emanating emissions respectively conduct intermediate the upper, lower and lateral portions each thermal radiation source and into the emission-receiving surface of the catalyst element, the catalyst element being maintained at a operative catalytic temperature via radiant heat energy provided by the upper, lower and lateral portions of each thermal radiation source respectively extending in a select source plane, the radiant heat energy thus converging toward a centralized portion of the catalyst element from variously angled upper directions, variously angled lower directions, and variously angled lateral directions respectively via the upper portion, the lower portion and lateral portion of each thermal radiation source, the temperature-maintained catalyst element effectively removes odors from emissions passing therethrough.

8. The catalyst conversion unit of claim 7 comprising an open space intermediate the thermal radiation sources and the catalyst element, the open space for enabling obstacle-free radiant heat energy transfer from the thermal radiation source to the catalyst element, the obstacle-free radiant heat energy transfer for enhancing maintenance of the operative catalytic temperature.

9. The catalyst conversion unit of claim 8 comprising a plurality of thermal radiation sources, radiant heat energy from adjacent thermal radiation sources traversing through one another, the radiant heat energy from the thermal radiation sources for maximizing multi-directional radiant heat energy bombardment of the catalyst element, the maximized multidirectional radiant heat energy bombardment enhances maintenance of the operative catalytic temperature.

10. The catalyst conversion unit of claim 9 wherein the catalytic conversion unit comprises a housing, the housing being sized and shaped for directing the emissions through the thermal radiation sources before entering the catalyst element, the thermal radiation sources tunnel-heat-treating the through-directed emissions before entry into the catalyst element.

11. A method for treating emissions from a cooking chamber, the method comprising the steps of:
   providing a block-shaped catalyst element, the catalyst element having a planar emission-receiving surface;
   juxtaposing a series of thermal radiation sources adjacent the catalyst element in a series of source planes parallel to the emission-receiving surface, each thermal radiation source having an upper portion, a lower portion, and a lateral portion connecting the upper and and positioning the thermal radiation source perpendicularly with respect to emission flow;
   energizing the series of thermal radiation sources for creating radiant heat energy;
   radiantly transferring heat energy toward the catalyst element via the juxtaposed thermal radiation sources;
   converging the radiant heat energy toward a centralized portion of the catalyst element from variously angled upper directions, variously angled lower directions, and variously angled lateral directions respectively via the series of parallel upper portions, series of parallel lower portions, and series of parallel lateral portions;
   maintaining an operative catalytic temperature of the catalyst element via the converging and radiantly transferred heat energy;
   directing chamber-emanating emissions into the temperature-maintained catalyst element by way of the series of thermal radiation sources from a variable temperature cooking chamber; and
   catalytically treating the directed emissions via the temperature-maintained catalyst element for removing odors from said emissions.

12. The method of claim 11 wherein the step of radiantly transferring heat energy to the catalyst element comprises the step of simultaneously directing variously angled radiant heat energy to the catalyst element downwardly from the upper portions, upwardly from the lower portions, and laterally from the lateral portions of the thermal radiation sources.

13. The method of claim 12 comprising the step of tunnel-heat-treating the chamber-emanating emissions while directing chamber-emanating emissions through the series of thermal radiation sources.

14. The method of claim 13 comprising the step of focusing the variously angled radiant heat energy upon a centralized portion of the catalyst element as emissions enter into the temperature-maintained centralized portion of the catalyst element.

15. A method for catalytically treating cooking emissions, the method comprising the steps of:
   providing a catalytic environment bound by a emission-receiving surface;
   energizing a series of thermal radiation sources for creating radiant heat energy, the thermal radiation sources respectively extending in a series of source planes and each having an upper portion, a lower portion, and a lateral portion connecting the upper and and positioning the thermal radiation source perpendicularly with respect to emission flow;
   radiantly transferring heat energy toward the emission-receiving surface of the catalytic environment via the series of thermal radiation sources;
   converging the radiant heat energy toward a centralized portion of the catalyst element from variously angled upper directions, variously angled lower directions, and variously angled lateral directions respectively, via the series of upper portions, series of lower portions, and series of lateral portions;
   maintaining an operative catalytic temperature of the catalytic environment via the converging and radiantly transferred heat energy;
   directing cooking emissions through the temperature-maintained catalytic environment by way of the series of thermal radiation sources; and
   catalytically treating the directed cooking emissions via the temperature-maintained catalytic environment for removing odors from said emissions.

16. The method of claim 15 wherein the step of radiantly transferring heat energy to the catalytic environment comprises the step of simultaneously directing variously angled radiant heat energy to the catalytic environment downwardly from the upper portions, upwardly from the lower portions, and laterally from the lateral portions of the thermal radiation sources.

17. The method of claim 16 comprising the step of tunnel-heat-treating the chamber-emanating emissions while directing chamber-emanating emissions through the series of thermal radiation sources.

18. The method of claim 17 comprising the step of focusing the variously angled radiant heat energy upon a centralized portion of the catalytic environment as emissions enter into the temperature-maintained centralized portion of the catalytic environment.

* * * * *